United States Patent
Sasidharan Rajalekshmi et al.

(10) Patent No.: US 11,907,380 B2
(45) Date of Patent: Feb. 20, 2024

(54) IN-MEMORY COMPUTATION IN HOMOMORPHIC ENCRYPTION SYSTEMS

(71) Applicant: International Business Machines Corporation, Armonk, NY (US)

(72) Inventors: Nandakumar Sasidharan Rajalekshmi, Thiruvananthapuram (IN); Flavio A. Bergamaschi, Southampton (GB); Evangelos Stavros Eleftheriou, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 498 days.

(21) Appl. No.: 17/321,538

(22) Filed: May 17, 2021

(65) Prior Publication Data
US 2022/0366059 A1    Nov. 17, 2022

(51) Int. Cl.
*G06F 21/00*    (2013.01)
*H04L 29/06*    (2006.01)
(Continued)

(52) U.S. Cl.
CPC .......... *G06F 21/602* (2013.01); *G06F 7/5443* (2013.01); *G06F 17/141* (2013.01);
(Continued)

(58) Field of Classification Search
None
See application file for complete search history.

(56) References Cited

U.S. PATENT DOCUMENTS

| 9,436,835 B1 | 9/2016 | Saldamli |
| 10,621,267 B2 | 4/2020 | Strachan |

(Continued)

FOREIGN PATENT DOCUMENTS

| CN | 112543091 A | 3/2021 |
| CN | 112711394 A | 6/2021 |

OTHER PUBLICATIONS

Aga et al., "Compute Caches", Proceedings of the IEEE International Symposium on High Performance Computer Architecture, Feb. 4-8, 2017, Austin, Texas, 12 pages.
(Continued)

*Primary Examiner* — Lisa C Lewis
(74) *Attorney, Agent, or Firm* — Edward J. Wixted, III

(57) ABSTRACT

In an approach, a process stores a matrix of multibit values for a computation in an analog multiply-accumulate unit including at least one crossbar array of binary analog memory cells connected between respective pairs of word- and bit-lines of the array, where: bits of each multibit value are stored in cells connected along a word-line, and corresponding bits of values in a column of the matrix are stored in cells connected along a bit-line. In each of one or more computation stages for a cryptographic element, the process supplies a set of polynomial coefficients of an element bitwise to respective word-lines of the unit to obtain analog accumulation signals on the respective bit-lines. The process converts the analog signals to digital. The process processes the digital signals obtained from successive bits of the polynomial coefficients in each of the stages to obtain a computation result for the cryptographic element.

20 Claims, 7 Drawing Sheets

(51) Int. Cl.
G06F 21/60 (2013.01)
G06F 21/79 (2013.01)
G06F 7/544 (2006.01)
G06F 17/16 (2006.01)
G11C 11/408 (2006.01)
G11C 11/4094 (2006.01)
G06F 17/14 (2006.01)
G06F 21/10 (2013.01)

(52) U.S. Cl.
CPC .............. *G06F 17/16* (2013.01); *G06F 21/79* (2013.01); *G11C 11/4085* (2013.01); *G11C 11/4094* (2013.01); *G06F 21/107* (2023.08)

(56) References Cited

U.S. PATENT DOCUMENTS

| 10,749,665 | B2 | 8/2020 | Laine | |
|---|---|---|---|---|
| 2016/0164671 | A1 | 6/2016 | Gentry | |
| 2018/0294950 | A1* | 10/2018 | Khedr | H04L 9/008 |
| 2020/0327287 | A1 | 10/2020 | Piveteau | |
| 2021/0326112 | A1* | 10/2021 | Chakraborty | G06N 3/065 |

OTHER PUBLICATIONS

Cao et al., "Optimised Multiplication Architectures for Accelerating Fully Homomorphic Encryption", Transactions on Computers, Nov. 6, 2015, 13 pages, <https://ieeexplore.ieee.org/document/7321798>.

Costache et al., "Faster Homomorphic Evaluation of Discrete Fourier Transforms", Financial Cryptology, 2017, 13 pages, <https://www.researchgate.net/publication/322002799>.

Hu et al., "Accelerating Discrete Fourier Transforms with dot-product engine," Proceedings of the 2016 IEEE International Conference on Rebooting Computing (ICRC), San Diego, CA, Oct. 17-19, 2016, 5 pages, <https://blogs.cuit.columbia.edu/zp2130/files/2019/01/Accelerating-Discrete-Fourier>.

Migliore et al., "A High-Speed Accelerator for Homomorphic Encryption using the Karatsuba Algorithm", Proceedings of the International Conference on Hardware/Software Codesign and System Synthesis, Oct. 15-20, 2017 South Korea, 17 pages, <https://dl.acm.org/doi/10.1145/3126558>.

Nejatollahi et al., "CryptoPIM: In-memory Acceleration for Lattice-based Cryptographic Hardware", Proceedings of the 57th ACM/IEEE Design Automation Conference (DAC), Virtual Conference, Jul. 19-Jul. 22, 2020, 6 pages, <https://ieeexplore.ieee.org/document/9218730>.

Reis et al., "Computing-in-Memory for Performance and Energy-Efficient Homomorphic Encryption", IEEE Transactions on Very Large Scale Integration (VLSI) Systems, Aug. 27, 2020, 14 pages, <https://ieeexplore.ieee.org/document/9179010>.

Sebastian et al., "Memory devices and applications for in-memory computing", Nature Nanotecnology, 2020, 16 pages.

International Search Report and Written Opinion, Aug. 23, 2022, from International Application PCT /IB2022/054255 iled May 8, 2022, IBM Docket No. P202007504.

* cited by examiner input coefficients of element $c_i$     column vectors of M $(0, 1, 3, 2, 1, 0, 2, 3) \cdot (3, 6, 2, 1, 4, 5, 7, 0) = 32$ $(0, 1, 3, 2, 1, 0, 2, 3) \cdot (1, 2, 4, 3, 7, 6, 1, 2) = 35$

IN-MEMORY COMPUTATION IN HOMOMORPHIC ENCRYPTION SYSTEMS

BACKGROUND

The present invention relates generally to the field of computation in homomorphic encryption systems, and more particularly to approaches for performing computations in homomorphic encryption systems using in-memory compute architectures.

Homomorphic encryption permits computations over encrypted data. Current viable homomorphic encryption schemes use polynomials to represent basic cryptographic elements, such as elements of cryptographic keys, ciphertexts, message data to be encrypted, and so on. These polynomials are typically of very large degree (e.g., 1024) with polynomial coefficients represented by a large number (e.g., 300 to 800) of bits each. Computations over these elements must be performed with high precision and are extremely compute-intensive. For example, the complexity of multiplication between two polynomials of degree N in $O(N^2)$ is highly inefficient. To address this inefficiency, homomorphic encryption algorithms have used Fast Fourier Transforms (FFTs) to reduce polynomial multiplication complexity to $O(N \log N)$. However, this still presents a major bottleneck for computations.

In-memory computing refers to techniques for performing certain computational tasks in situ in computational memory units employing arrays of memory cells. "Computing-in-Memory for Performance and Energy-Efficient Homomorphic Encryption", Reis et al., IEEE Transactions on Very Large Scale Integration (VLSI) Systems, Volume 28, Issue 11, November. 2020, and "CryptoPIM: In-memory Acceleration for Lattice-based Cryptographic Hardware", Nejatollahi et al., 57th ACM/IEEE Design Automation Conference (DAC), July 2020, propose in-memory compute hardware for cryptographic computation. These proposals use in-memory logic arrays in which binary logic is incorporated in arrays of memory cells to implement certain calculations for cryptographic computations. While these systems offer some improvement in processing speed, improved techniques for implementing computations in homomorphic encryption systems would be highly desirable.

SUMMARY

A first aspect of the present invention provides a method of computation in a homomorphic encryption system in which cryptographic elements are represented by polynomials with multibit coefficients. The method includes storing a matrix of multibit values for a computation in an analog multiply-accumulate unit comprising at least one crossbar array of binary analog memory cells connected between respective pairs of word- and bit-lines of the array. Bits of each multibit value are stored in cells connected along a word-line, and corresponding bits of values in a column of the matrix are stored in cells connected along a bit-line. In each of one or more computation stages for a cryptographic element, a set of the polynomial coefficients of that element are supplied bitwise to respective word-lines of the unit to obtain analog accumulation signals on the bit-lines. The method further comprises converting the analog accumulation signals to digital signals, and processing the digital signals obtained from successive bits of the coefficients in each of the computation stages to obtain a required computation result for the cryptographic element.

By exploiting analog multiply-accumulate units for computations in which polynomial coefficients are supplied bit-wise to an array of binary analog cells, methods embodying the invention offer extremely high-speed computations over cryptographic elements with the high precision needed in homomorphic encryption systems. Unlike the in-memory logic arrays of references above, the results of bitwise vector-matrix multiplications are accumulated on bit-lines of the array, offering significant reduction in complexity and compute time for cryptographic computations.

Embodiments of the invention offer efficient implementation of various computations in homomorphic encryption systems. An embodiment computes the result of a polynomial multiplication $c_1 c_2$ between a first cryptographic element $c_1$ and a second cryptographic element $c_2$. This method includes storing the polynomial coefficients of element $c_2$ in the multiply-accumulate unit as respective multibit values in a column of the matrix. In successive computation stages, the coefficients of element $c_1$ are progressively shifted relative to the set of word-lines connected to cells storing coefficients of $c_2$ until all coefficients of $c_1$ have been supplied bitwise to all word-lines in that set. The digital signals obtained, in each of the stages, from the set of bit-lines connected to cells storing coefficients of $c_2$ and from successive bits of the coefficients of $c_1$ are processed to obtain the result of the polynomial multiplication $c_1 c_2$. The result here is typically computed as $c_1 c_2$ modulo p, where p is a predefined prime number for the homomorphic encryption system. This provides an exceptionally efficient technique for multiplication of polynomial cryptographic elements. Moreover, multiple polynomial multiplications can be performed in parallel in the multiply-accumulate unit as explained in more detail below.

The polynomial multiplication technique can be applied to particular advantage for homomorphic decryption. Here, the second cryptographic element $c_2$ is an element s of a secret key (1, s) of the homomorphic encryption system, and the first cryptographic element $c_1$ is an element of a cyphertext $(c_0, c_1)$ encrypted under a corresponding public key, where $c_0$ is another cryptographic element. This method includes, after obtaining the result of the polynomial multiplication $c_1 s$, computing a sum of $c_1 s$ and the element $c_0$ to obtain a decryption $m = c_0 + c_1 s$ modulo p of the cyphertext. The secret key s is relatively static, i.e., infrequently changed in operation of the system, and storing this element in the multiply-accumulate unit enables fast decryption of all input ciphertexts. Multiple cyphertexts can also be decrypted in parallel, providing a highly efficient homomorphic decryption engine. Embodiments can also employ a hybrid system whereby polynomial multiplication is performed in the multiply-accumulate unit and the sum $c_0 + c_1 s$ is computed using an in-memory logic array.

The polynomial multiplication technique can also be used to perform homomorphic inference on encrypted data. Here, encrypted weights w of a neural network inference model comprise respective cryptographic elements $c_w$, and the polynomial coefficients of each element $c_w$ are stored in the multiply-accumulate unit as respective multibit values in a column of the matrix. Encrypted data values d to be weighted and propagated through the network in an inference operation comprise respective cryptographic elements $c_d$ for which polynomial multiplication $c_d c_w$ is required to weight a data value d by a weight w. Each polynomial multiplication $c_d c_w$ in the inference operation can be performed as described above, where $c_d$ corresponds to the first cryptographic element $c_1$ and $c_w$ corresponds to the second cryptographic element $c_2$. The results of all polynomial multiplications $c_d c_w$ as encrypted data values are propagated through the network are processed to obtain an encrypted inference result from the model.

Further embodiments, detailed below, employ techniques based on Discrete Fourier Transforms for multiplying cryptographic elements using analog multiply-accumulate units.

A second aspect of the invention provides computation apparatus of a homomorphic encryption system in which cryptographic elements are represented by polynomials with multibit coefficients. The apparatus comprises an analog multiply-accumulate unit having at least one crossbar array of binary analog memory cells connected between respective pairs of word- and bit-lines of the array, and control logic adapted to implement a computation method according to the first aspect of the invention. The control logic may include ($\log_2 q$)-bit analog-to-digital convertor circuitry for converting the analog accumulation signals to digital signals, where q is the number of word-lines to which the polynomial coefficients are supplied.

Embodiments of the invention will be described in more detail below, by way of illustrative and non-limiting example, with reference to the accompanying drawings.

DETAILED DESCRIPTION

Embodiments of the invention can be employed in any homomorphic encryption (HEnc) system in which computations are performed over cryptographic elements which are represented by polynomials. The cryptographic elements may be any polynomial elements of an HEnc scheme over which computations need to be performed, such as elements of cryptographic keys, ciphertexts, message data, and so on. In HEnc schemes based on the RLWE (Ring Learning with Errors) problem, for instance, cryptographic elements are represented by polynomials which are elements of a finite polynomial ring. These polynomials, e.g. of the form $a_0+a_1 x+a_2 x^2+ \ldots +a_{n-1}x^{n-1}+a_n x^n$, are of very large degree (e.g. n=1024), and have coefficients $a_0$, $a_1$, etc., which are represented by large numbers (e.g. many hundreds) of bits. These schemes exploit a homomorphic property to allow computations to be performed over encrypted data. For example, if messages $m_1$ and $m_2$ are encrypted as ciphertexts $E(m_1)$ and $E(m_2)$ under the encryption scheme, then $E(m_1)*E(m_2)=E(m_1*m_2)$ for some operator *.

Figure 1:
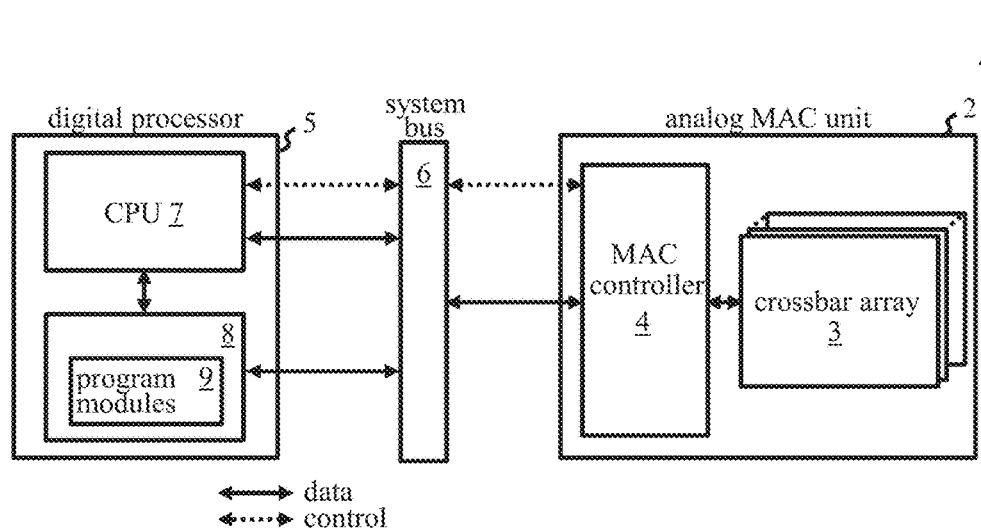
FIG. 1 is a schematic illustration of computation apparatus, in accordance with an embodiment of the present invention.

FIG. 1 is a schematic block diagram of computation apparatus 1 embodying embodiments of the invention for performing computations in an HEnc system. The apparatus 1 comprises an analog multiply-accumulate (MAC) unit 2 having a set of crossbar arrays 3 of binary analog memory cells. Control logic, implemented here by a MAC controller 4 and a digital processor 5, controls operation of crossbar arrays 3 to perform computations on cryptographic elements represented by polynomials having multibit coefficients. Digital processor 5 is operatively coupled, here via a system bus 6, to analog MAC unit 2. The digital processor comprises a central processing unit (CPU) 7 and digital memory 8. Digital memory 8 stores one or more program modules 9 comprising program instructions executable by CPU 7 to implement functionality for controlling cryptographic computations of the HEnc system. Depending on the HEnc system in which apparatus 1 is employed, such program modules may, for example, implement steps of cryptographic algorithms for encryption and/or decryption of data via an HEnc scheme, and/or computations over cryptographic elements in applications based on HEnc schemes, using MAC unit 3 for at least some steps of these computations.

MAC controller 4 provides the control circuitry for controlling application of signals to crossbar arrays 3 to store data values in cells of an array, to apply signals for computations in an array, and to process signals output by an array as described in more detail below. While a plurality of crossbar arrays 3 are shown in FIG. 1, in general MAC unit 2 may include one or more crossbar arrays.

While FIG. 1 shows an exemplary embodiment of apparatus 1, digital processor 5 may comprise one or more CPUs (including GPUs (graphics processing units)) which may be implemented by one or more microprocessors. Memory 8 may comprise one or more data storage entities, and may comprise main memory, e.g., DRAM (Dynamic Random-Access Memory) and/or other storage which is physically separated from CPU 7, as well as cache and/or other memory local to CPU 7. In general, digital processor 5 may be implemented by one or more (general- or special-purpose) computers/programmable data processing apparatus, and steps of processing operations performed by the digital processor may be implemented by hardware or software or a combination thereof. MAC controller 4 may comprise hardwired logic and/or one or more processors which are configurable by software instructions to perform control operations in MAC unit 2. Digital processor 5 may be integrated with MAC unit 2 in some embodiments, e.g., in a SoC (System on Chip) design.

In some embodiments, digital processor 5 and/or MAC controller 4 may include electronic circuitry such as programmable logic circuitry, field-programmable gate arrays (FPGAs), or programmable logic arrays (PLAs) for executing program instructions to implement functions described. Program instructions/program modules may include routines, programs, objects, components, logic, data structures, and so on that perform particular tasks or implement particular abstract data types. Digital processor 5 and/or MAC controller 4 may also comprise special-purpose hardware-based systems, such as ASICs (Application-Specific Integrated Circuits), to implement particular functionality.

System bus 6 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus. System bus 6 may represent a communications network connecting digital processor 5 to sub-units of MAC controller 4 which control individual crossbar arrays, or subsets of arrays, in some embodiments.

Figure 2:
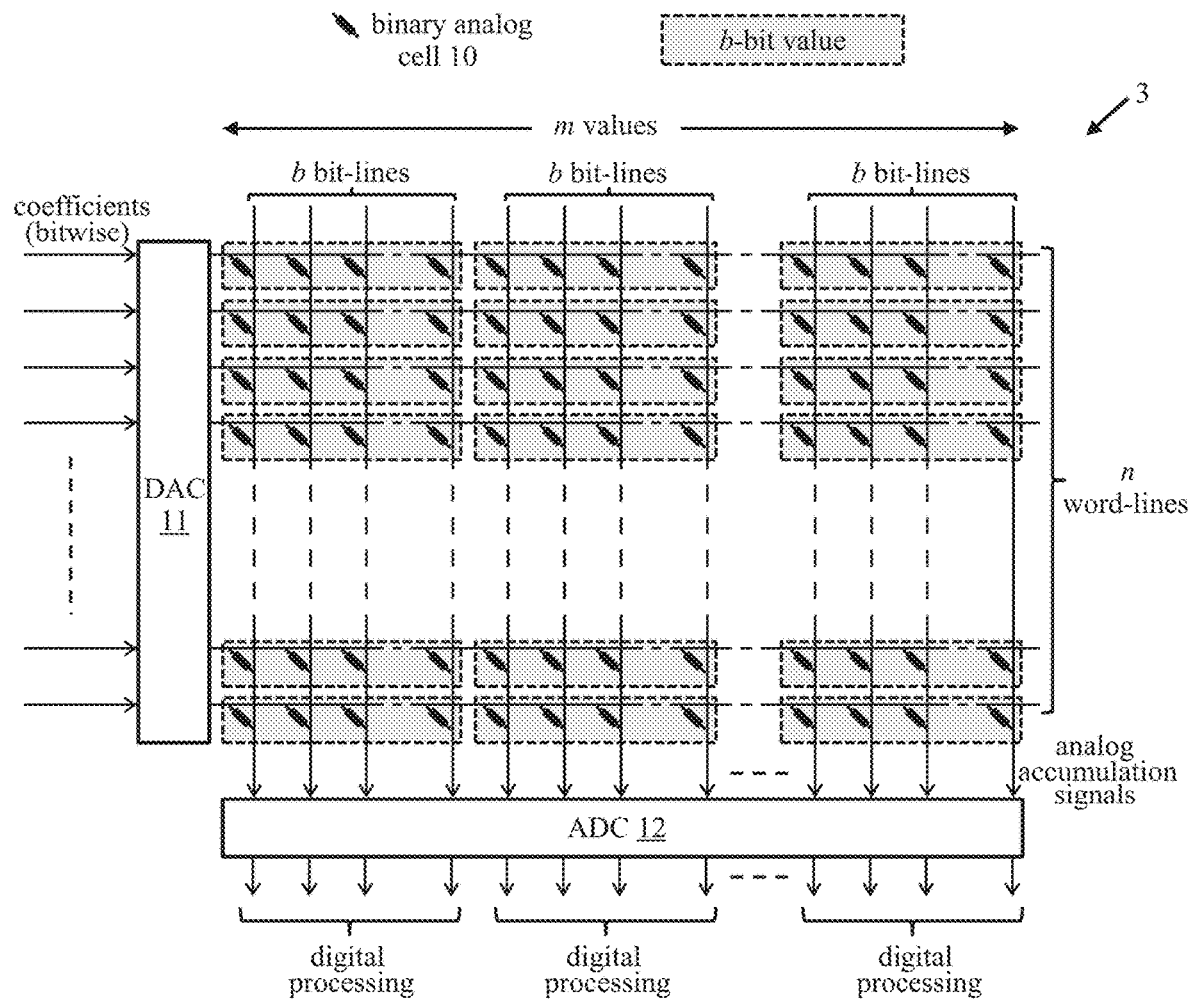
FIG. 2 illustrates structure of an array of analog memory cells storing a matrix of multibit values in the apparatus of FIG. 1, in accordance with an embodiment of the present invention.

To perform a computation in apparatus 1, a matrix M of multibit values for the computation is stored in one or more crossbar arrays 3 of the MAC unit 2. FIG. 2 illustrates logical structure of a crossbar array 3. This comprises an array of binary analog memory cells 10 which are connected between respective pairs of word- and bit-lines as illustrated. Each memory cell 10 comprises an analog memory device for storing a binary state 0 or 1 corresponding to one bit of a multibit value which is stored in a plurality of the cells 10. Bits of each multibit value in the matrix M are stored in cells connected along a word line. Corresponding bits of multibit values in a column of M are stored in cells connected along a bit-line. In the example shown, an n-by-m matrix M of b-bit values is stored in cells 10 connected between n word-lines and m×b bit-lines of a single array 3. The m b-bit values in a row of M are stored m sets of b cells connected along a word line. Corresponding bits of the n b-bit values in a column M are stored in cells connected along a bit-line. Digital signals input to array 3 for a computation are converted, by digital-to-analog converter (DAC) circuitry 11, to analog signals which are applied to the word-lines. The resulting analog signals obtained on the bit-lines are converted to digital signals by analog-to-digital converter (ADC) circuitry 12 for further processing.

While a matrix M with multiple columns is illustrated in FIG. 2, in general the matrix M for a computation may have m≥1 columns of multibit values. Also, while the matrix is stored in a single array 3 in this example, a matrix M may be stored in a plurality of arrays as explained below.

Figure 3:
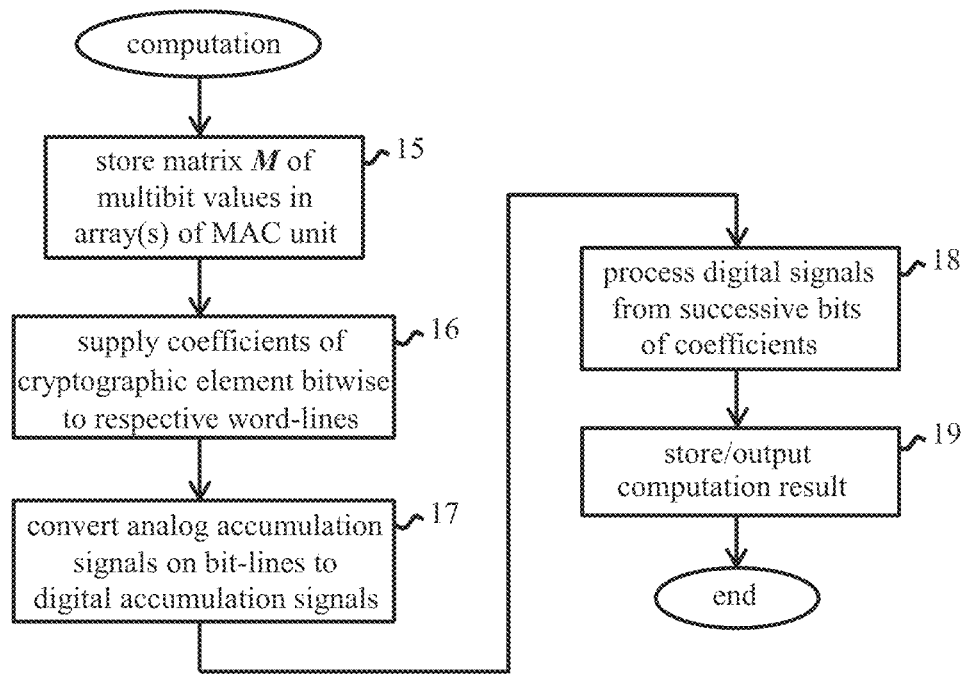
FIG. 3 indicates steps of a computation performed by the apparatus of FIG. 1 on a cryptographic element, in accordance with an embodiment of the present invention.

FIG. 3 indicates basic steps of a computation process in apparatus 1. Step 15 represents storage of the matrix M for a computation in one or more arrays of MAC unit 2 as described above. In step 16, a set of the polynomial coefficients of a cryptographic element are supplied bitwise (i.e., bit-by-bit) to respective word-lines of the unit. As each bit of the input coefficients is supplied to the word-lines, analog accumulation signals are obtained on the bit-lines at the input to ADC 12. In particular, the input bit value supplied to a word-line is effectively multiplied (in the analog domain) by the bit value stored in a cell 10 connected to that word-line to provide a current, or no current, from that cell on the connected bit line, corresponding to the multiplication result 1 or 0 respectively. The contributions from all cells on a given bit-line provide the analog accumulation signal at the output of that bit-line. This represents an accumulation of the multiplication results from all cells on the bit line, and hence the result of multiplying the vector of input bits on the word lines by the vector of stored bits in cells connected to that bit-line. This occurs in parallel for all bit lines, effecting a bit-wise vector-matrix multiplication. As indicated at step 17, the analog accumulations signals obtained on all bit-lines, for successive bits of the input coefficients, are converted to digital accumulation signals by ADC 12. Steps 16 and 17 may be repeated for each of a plurality of stages of the computation as explained further below. In step 18, the resulting digital signals obtained from successive bits of the input coefficients in each of the (one or more) computation stages are processed to obtain a required computation result for the cryptographic element. This processing may be performed in one or a combination of MAC controller 4 and digital processor 5. In step 19, the computation result is then stored, in MAC controller 4 or digital memory 8, for use in further cryptographic computations and/or may be output by digital processor 5 as a final computation result for a cryptographic process.

The analog memory cells 10 of MAC unit 2 may be implemented by non-volatile or persistent memory cells comprising any of a variety of resistance- or charge-based memory devices in which analog computation is based on use of currents or charges respectively. Examples of charge-based memory devices include DRAM, SRAM (Random-Access Memory) and flash memory devices, and resistance-based devices include PCM (Phase-Change Memory), RRAM (Resistive Random-Access Memory) and STT-MRAM (Spin-Transfer Torque Magnetic Random-Access Memory) for example. Input signals are applied as voltages on the word-lines and, depending on cell-type, vector-matrix multiplication occurs via a combination of Ohm's or Coulomb's law and Kirchhoff's circuit laws, making use of the physical structure of the array. The results are derived from the net analog currents or voltages read through the bit-line ADC. The MAC control circuitry for storing values in cells 10, and for driving cells during array computations, can be implemented in known manner according to the particular implementation of the analog cells.

Figure 4:
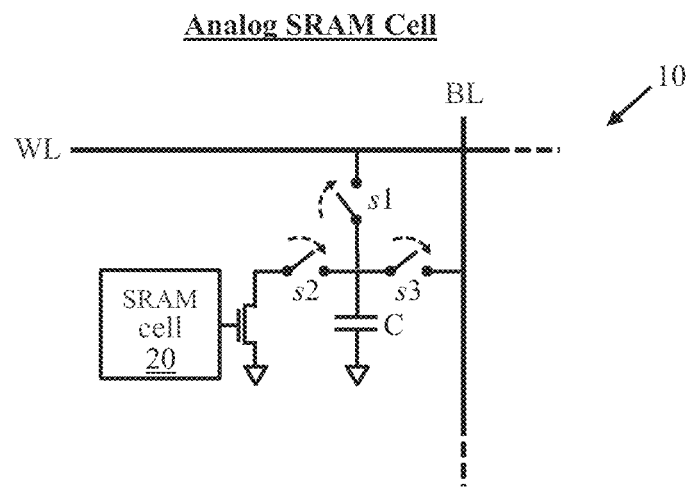
FIG. 4 shows an example of an analog memory cell in the FIG. 2 array, in accordance with an embodiment of the present invention.
Figure 5:
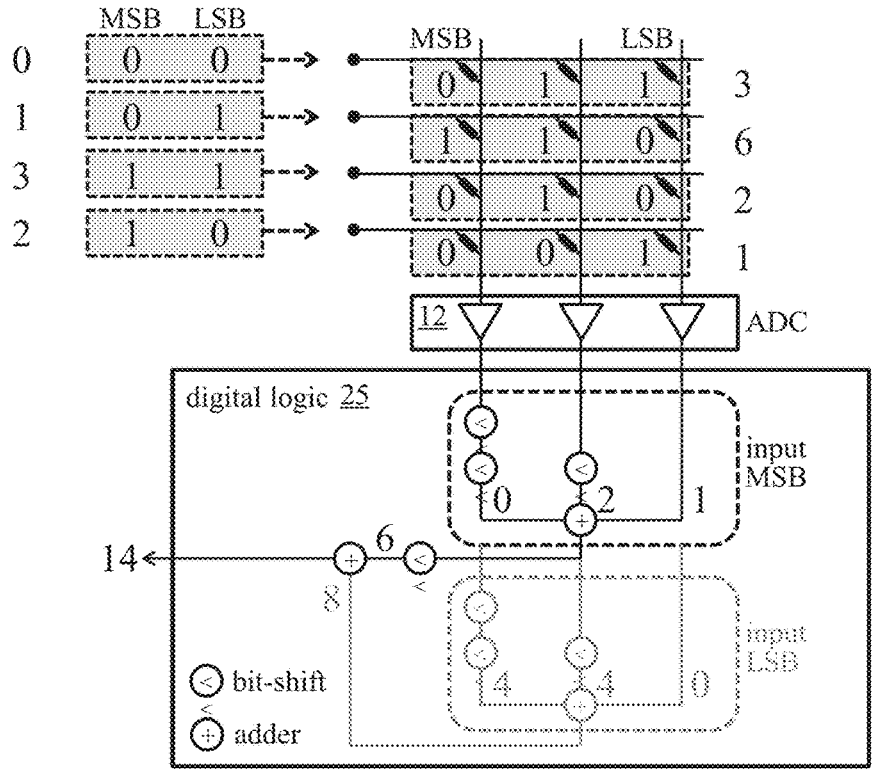
FIG. 5 illustrates processing of digital signals obtained from analog accumulation signals on bit-lines of an array, in accordance with an embodiment of the present invention.

In some embodiments of apparatus 1, the analog cells 10 comprise analog SRAM cells. An example of an analog SRAM cell is shown in FIG. 4. The analog cell 10 includes a standard digital SRAM cell 20 connected between a word-line WL and a bit-line BL via circuitry comprising a capacitor C and switches s1, s2 and s3 as shown. Digital SRAM cell 20 stores one bit of a multibit value as previously described. In a first step of the array operation, switch s1 is closed and an input signal corresponding to the input bit value, 0 or 1, is applied to word-line WL. The capacitor C is charged, or remains uncharged, depending on whether the input bit is 1 or 0. Switch s2 is then closed whereby capacitor C will be discharged if cell 20 stores a bit value 0. Finally, switch s3 is closed, shorting capacitors of all cells along the bit line BL, whereby charge-sharing produces a final voltage on the bit-line corresponding to the accumulation result.

Where values in more than one column of matrix M are stored in an array 3, the digital accumulation signals are processed on a column-by-column basis. In some embodiments, MAC controller 4 includes processing logic for processing the digital signals obtained from respective columns of the matrix. For each bit of the coefficients supplied bitwise to the word lines, this processing logic accumulates the digital signals obtained from the set of bit-lines connected to cells storing values in a column of the matrix with successive bit-shifts corresponding to successive bit-positions of those values. The resulting digital signals for successive input bits of the coefficients are also accumulated with successive bit-shifts corresponding to successive bit-positions of the coefficients. FIG. 5 illustrates implementation and operation of this processing logic for a simplified example.

The processing logic in FIG. 5 is implemented by hard-wired digital logic 25 at the periphery of an array 3. In this simplistic example, an input cryptographic element $c_1$ is represented by a polynomial coefficient vector (0, 1, 3, 2) with four two-bit coefficients. The portion of the array shown stores a column vector (3, 6, 2, 1) of M with four 3-bit values. The coefficients of $c_1$ are supplied bit-wise to respective word-lines, LSB (Least Significant Bit) first. ADC 12 is a $\log_2$ q-bit ADC, where q is the number of word-lines to which the coefficients are supplied, here q=4. The resulting digital signal from each bit line represents the result of multiplying the vector of LSBs of the input coefficients with the vector of bits stored in cells connected to that bit-line. These signals are supplied to digital logic 25 and are processed as indicated in, at least, the input LSB section of logic block 25. The digital signals input to this section have values (1, 2, 0), expressed in decimal, in MSB (Most Significant Bit)-to-LSB order of bit-positions of values in the array. These signals are scaled, as indicated, by bit-shifts corresponding these bit-positions to obtain values $1 \times 2^2$, $2 \times 2^1$, $0 \times 2^0 = (4, 4, 0)$. The shifted signals are accumulated to obtain a binary signal of decimal value 8. The MSBs of the input coefficients are then supplied to the array, and the results are processed by the same logic as indicated in, at least, the input MSB section of block 25. An additional bit-shift, corresponding to the MSB position of the input coefficients, is applied to the sum of the signal values (0, 2, 1)=3 (binary 11) to obtain binary 110=6. The results from both bits of the input coefficients are then added to obtain the dot product result (0, 1, 3, 2)·(3, 6, 2, 1)=14 as required.

Figure 6:
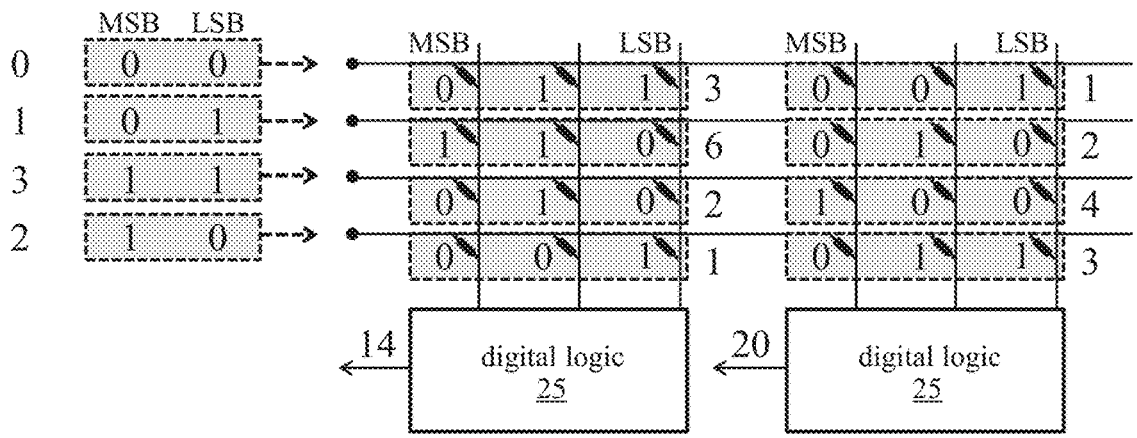
FIG. 6 illustrates parallel processing of digital signals from columns of a matrix in the array, in accordance with an embodiment of the present invention.

The above example is simplistic, but the same principles can be applied to the large polynomial coefficient vectors of real cryptographic elements and stored b-bit values with large numbers of bits. As illustrated in FIG. 6, digital logic 25 can be associated with each of multiple columns of values in an array 3, allowing bitwise vector-matrix multiplication to be performed in a parallel fashion.

Figure 7:
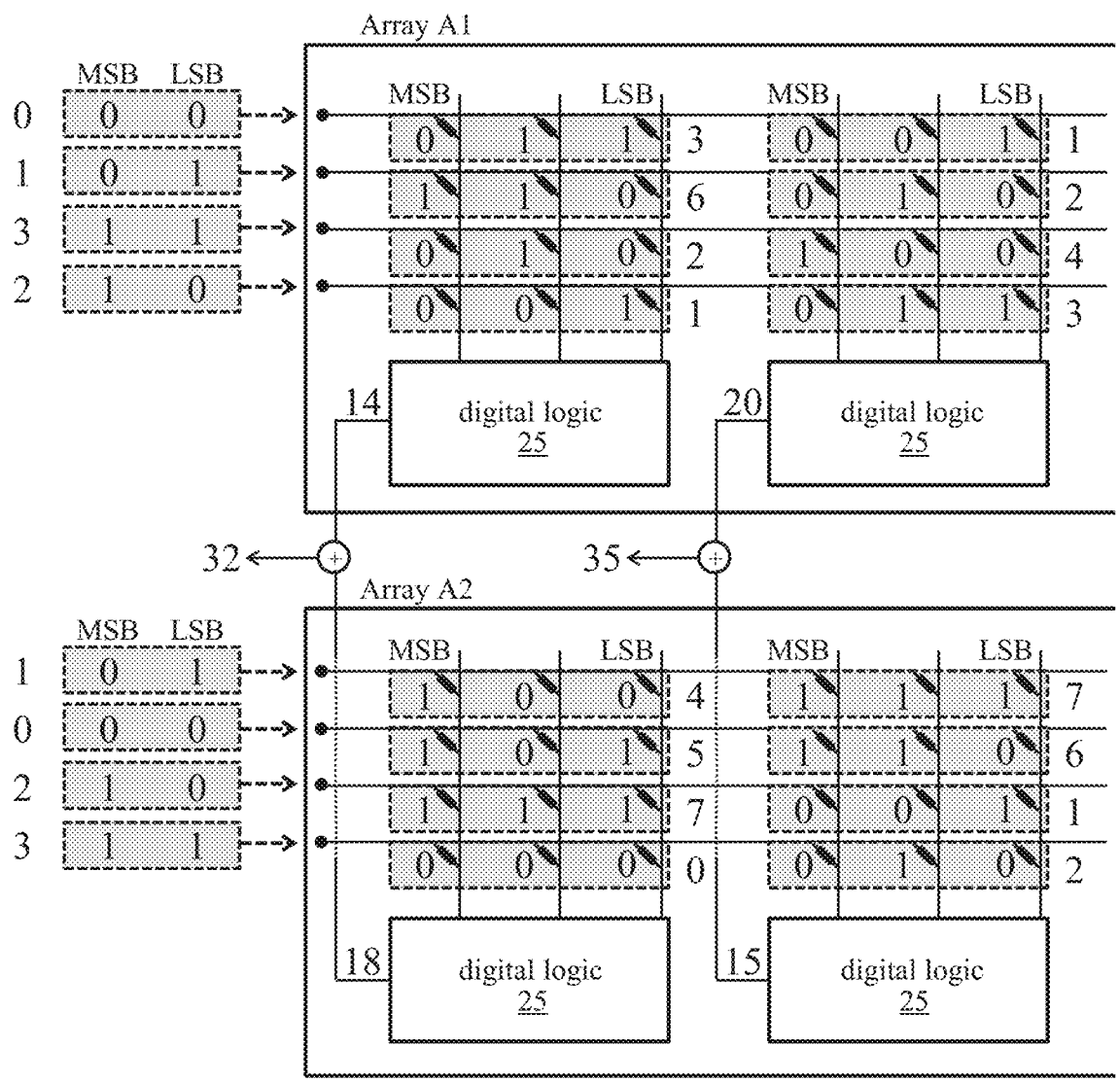
FIG. 7 illustrates a computation performed over two arrays for a cryptographic element, in accordance with an embodiment of the present invention.

When the matrix M or the coefficient vector to be processed in the MAC unit is larger than the size of a single array, the matrix M or the coefficient vector can be mapped to multiple arrays and the multiplication results from these arrays can be combined to generate the final result. FIG. 7 illustrates this technique for an example in which computation is performed over two arrays A1 and A2. Rows of M may also be distributed over multiple arrays in some embodiments.

The above technique allows vector-matrix multiplication for cryptographic computations to be performed with O(1) time-complexity. The decision bounds in ADC 12 can be tuned to accommodate any offsets from non-idealities of the array or analog memory cells. The use of analog SRAM cells 10 simplifies this task by reducing the one and zero state variability of cells. The bitwise operation thus allows computations to be performed with the bit-level accuracy required for HEnc systems.

Figure 8:
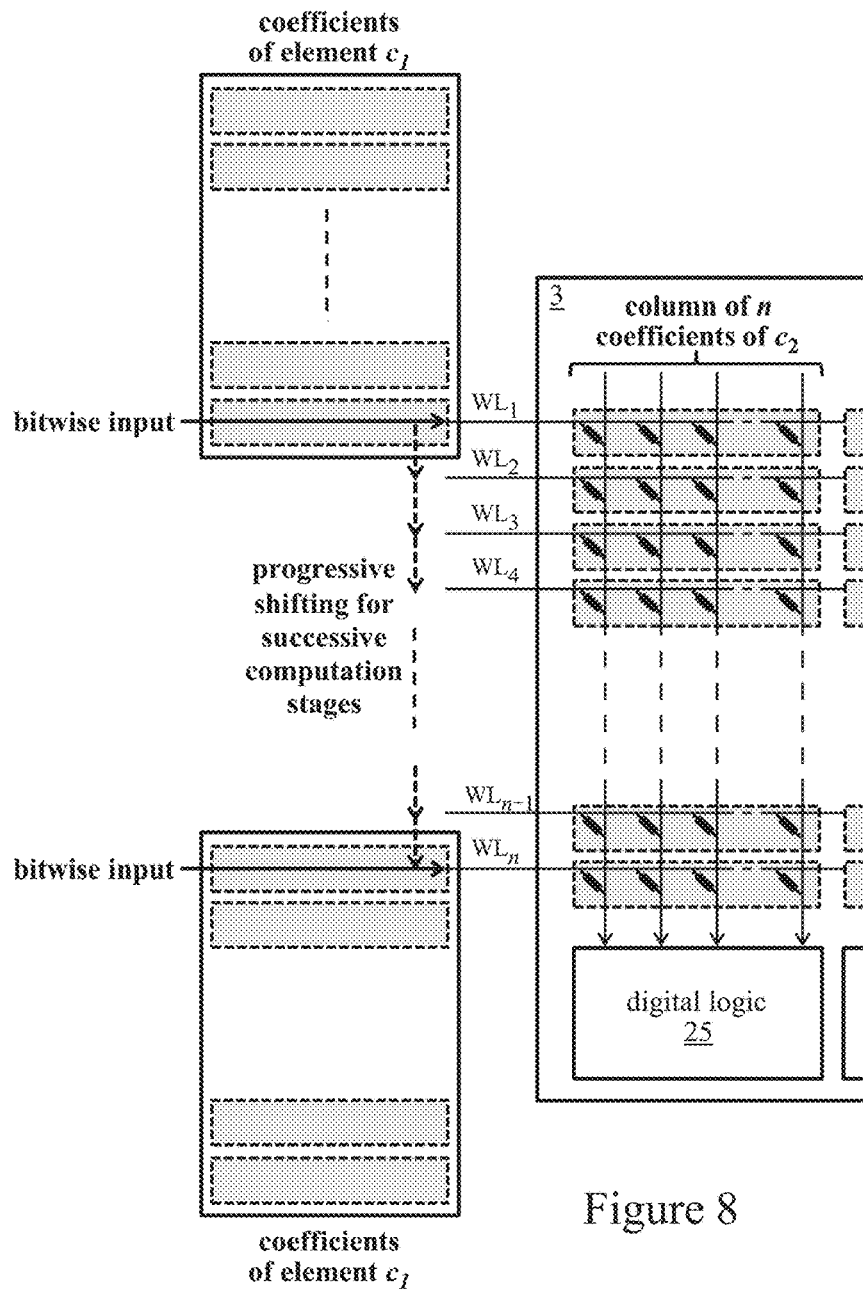
FIG. 8 illustrates a multistage computation for polynomial multiplication of cryptographic elements, in accordance with an embodiment of the present invention.

Some embodiments employ a technique for computing the result of a polynomial multiplication $c_1c_2$ between a first cryptographic element $c_1$ and a second cryptographic element $c_2$. This technique is illustrated in FIG. 8. Here, n coefficients of an element $c_2$ are stored in MAC unit 2 (in this example in a single array 3) as respective multibit values in a column of matrix M. In each of successive stages of the computation, a set of $c_1$ coefficients is supplied to the array, where the number of coefficients in these sets progressively increases, then decreases, over successive stages. In particular, as illustrated in the figure, MAC controller 4 progressively shifts the coefficients of element $c_1$ relative to the set of word-lines (here $WL_1$ to $WL_n$) connected to cells storing coefficients of $c_2$ until all coefficients of Cl have been supplied bitwise to all word-lines in that set. The digital signals obtained, in each of the computation stages, from the set of bit-lines connected to cells storing coefficients of $c_2$ and from successive bits of the coefficients of $c_1$ are then processed as described above to obtain the result of the polynomial multiplication $c_1c_2$. Operation of this technique can be understood from a simple example as follows.

Consider a simple polynomial multiplication $c_1c_2$ for $c_1=(ax^2+bx)$ and $c_2=(cx^2+dx)$ $$(ax^2 + bx)(cx^2 + dx) = acx^4 + adx^3 + bcx^3 + bdx^2$$
$$= acx^4 + (ad + bc)x^3 + bdx^2$$

Figure 9:
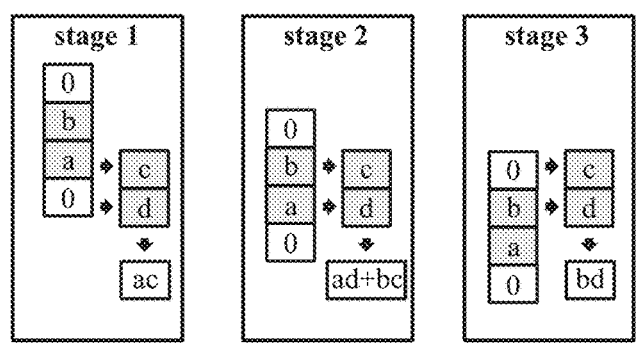
FIG. 9 shows example stages of the computation of FIG. 8, in accordance with an embodiment of the present invention.

FIG. 9 shows three successive computation stages of the FIG. 8 technique which output the required coefficients of the resulting polynomial $c_3=c_1c_2$. This provides an exceptionally efficient technique for high-precision multiplication of polynomial cryptographic elements. Where, as is typically required in HEnc systems, polynomial multiplication is required under modulus p, the modulo operation can be accommodated in the digital processing to obtain $c_3=c_1c_2$ modulo p. Modulo operations can be performed in known manner in logic of MAC controller 4 (e.g., by an additional modulo circuit in digital logic 25) and/or in digital processor 5 as required. The digital processing may also include a relinearization operation to obtain a polynomial $c_3=c_1c_2$ of the same degree as $c_1$ and $c_2$. Relinearization can be achieved using a variety of standard techniques for homomorphic encryption applications as will be apparent to those skilled in the art.

One or more further polynomial multiplications $c_1c$ can be performed in parallel in FIG. 8 by storing the coefficients of a cryptographic element c in a further column of M, in cells connected to the same set of word-lines $WL_1$ to $WL_n$. The digital signals obtained from the corresponding bit-lines are then processed as above.

The technique described in FIG. 8 can be applied to particular advantage for homomorphic decryption. Here, the second cryptographic element $c_2$ is an element s of a secret key (1, s) of the homomorphic encryption system, and the first cryptographic element $c_1$ is an element of a cyphertext $(c_0, c_1)$ encrypted under a corresponding public key, where $c_0$ is another cryptographic element. In particular:

let (1, s) be the secret key for the RLWE-based homomorphic encryption;
let $(c_0^*, c_1^*)$ be the public key $(c_0^*=pe^*-c_1s$, where $e^*$, $c_1^*$ are polynomials and p is a prime);
let the plain text message be encoded into a polynomial m;
let $(e_0, e_1)$ be randomly generated noise polynomials; and
let $(c_0, c_1):=r(c_0^*, c_1^*)+p(e_0, e_1)+(m, 0)$ be the encryption of the message m, where r is a random constant for the encryption process.

The message m can then be recovered via the decryption process as $c_0+c_1s$ mod p. In a decryption system employing the FIG. 8 technique, the secret key s is stored in MAC unit 2 and the coefficients of element $c_1$ are supplied to the unit to obtain the result of the polynomial multiplication $c_1 s$. The sum of $c_1 s$ and the element $c_0$ can then be computed to obtain a decryption $m = c_0 + c_1 s$ modulo$_p$ of the cyphertext. This provides a highly efficient homomorphic decryption engine in which one or more input ciphertexts can be decrypted by parallel computation in the MAC unit.

Figure 10:
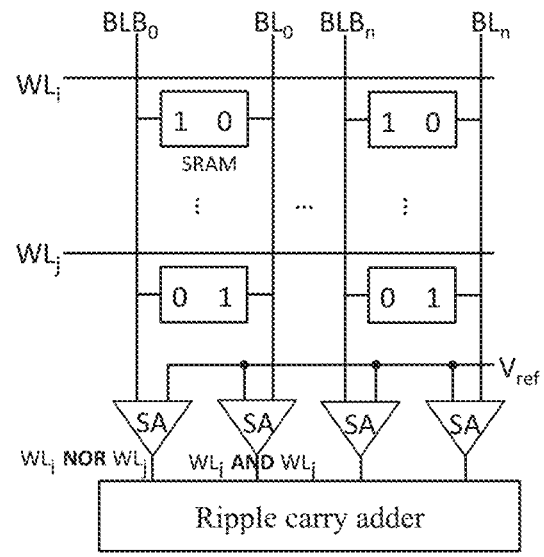
FIG. 10 illustrates a structure of an in-memory logic array for additional computations, in accordance with an embodiment of the present invention.

While the sum $c_0 + c_1 s$ may be computed in digital processor 5, some embodiments may employ a hybrid in-memory compute system in MAC unit 2. Here, the polynomial multiplication $c_1 s$ is performed in MAC unit 2 as described above, and the sum $c_0 + c_1 s$ is computed using an in-memory logic array. The in-memory logic can be implemented using known SRAM arrays, an example of which is described briefly with reference to FIG. 10. Coefficients from two polynomials to be added are stored along two word-lines $WL_i$ and $WL_j$ but share the same bit-lines as in FIG. 10. By enabling the two word-lines together, a modified sense amplifier (SA) can compute NOR and AND operations between the bit-lines. Performing NOR on the two SA results from a bit-line computes XOR between the two bits. XOR and AND together constitute a half-adder circuit. Half-adder results from multiple bit-lines can be combined by a ripple carry adder to perform addition of the polynomial coefficients.

The FIG. 8 technique can of course be applied for polynomial multiplications required in any computations of an HEnc scheme, e.g., in key generation and/or encryption operations. Hybrid embodiments may also use known in-memory logic units for operations other than addition, e.g., subtraction, scaling and/or component-wise multiplication of cryptographic elements. For example, by using two's-compliment of the coefficients of one of the polynomials, the FIG. 10 logic can be used for subtraction.

The technique described in FIG. 8 can also be used to implement a homomorphic inference system for encrypted data. In particular, weights of a neural network inference model can be encrypted as cryptographic elements of an HEnc scheme and stored in MAC unit 2. Neural network (NN) models exploit a logical construction in which a series of layers of neurons are interconnected so that output signals of neurons in one layer are weighted and transmitted to neurons in the next layer. By exposing the network to a set of training data, NN models can be trained in known manner to perform inference (e.g., classification or regression operations) for input data, for instance to classify digital images according to their image content. The resulting trained network, with weights defined via the training operation, can be applied to new (previously unseen) data to perform inference tasks for the application in question.

Figure 11:
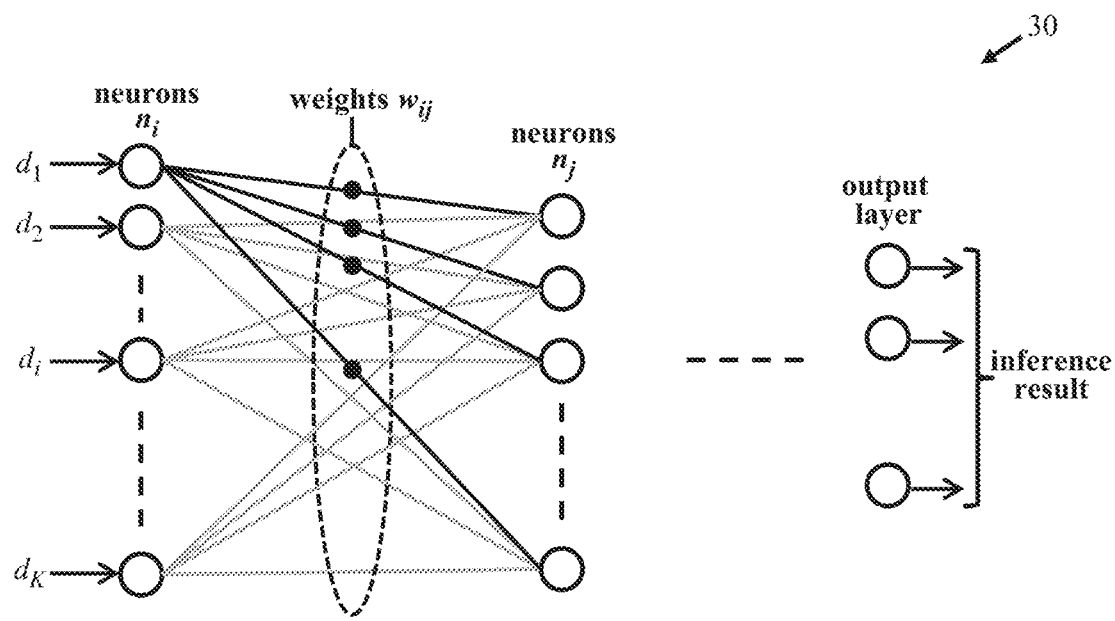
FIG. 11 is a schematic representation of a network layer in a neural network inference model, in accordance with an embodiment of the present invention.

FIG. 11 shows a simple schematic of an exemplary NN model 30, showing connections in the first network layer. Neurons at the layer input are denoted by $n_i$ (i=1 to K) and neurons at the layer output are denoted by $n_j$ (j=1 to L). Each neuron $n_i$ is connected to each neuron $n_j$ and a weight $w_{ij}$ is defined for each neuron-neuron connection. An input data value $d_i$ supplied to a neuron $n_i$ is transmitted to each neuron $n_j$ after weighting by the corresponding weight $w_{ij}$ for the neuron pair. Each neuron $n_j$ generates an activation signal dependent on its accumulated weighted inputs from neurons $n_i$. Weighted signals can thus be propagated in this way through successive layers of the network, whereby neurons in an output layer provide the inference result from the network.

In an HEnc inference system, inference is performed on data values encrypted under an HEnc scheme. The parameters (weights, activations functions, etc.) of the NN model are also encrypted via the HEnc scheme. In particular, in a homomorphic inference system employing the FIG. 8 technique, encrypted weights w of the NN inference model comprise respective cryptographic elements $c_w$, and the coefficients of each element $c_w$ are stored in MAC unit 2 as respective multibit values in a column of the matrix M. Encrypted data values d to be weighted and propagated through the network in an inference operation comprise respective cryptographic elements cd for which polynomial multiplication $c_d c_w$ is required to weight a data value d by a weight w. Each polynomial multiplication $c_d c_w$ in the inference operation can be performed as described with reference to FIG. 8, where $c_d$ corresponds to the first cryptographic element $c_1$ and $c_w$ corresponds to the second cryptographic element $c_2$.

Figure 12:
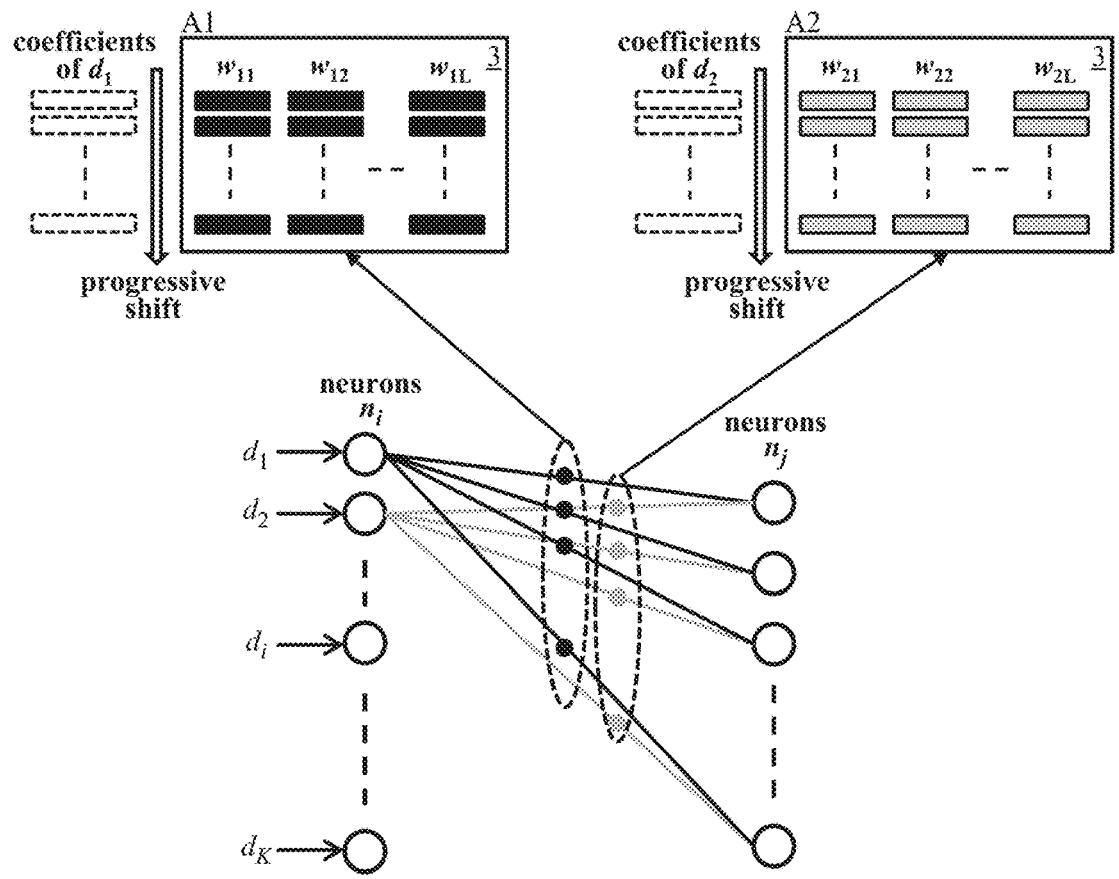
FIG. 12 illustrates implementation of computations for a homomorphic inference operation, in accordance with an embodiment of the present invention.

FIG. 12 shows how the polynomial multiplications for input data values $d_1$ and $d_2$ in NN model 30 can be mapped to arrays A1 and A2 and computed via the technique disclosed in reference to FIG. 8. Each encrypted data value $d = d_1$ or $d_2$ must be weighted by a plurality of weights $w_j$=1 to L for propagation through the network, requiring a corresponding plurality of polynomial multiplications $c_d c_{w_j}$. The coefficients of each element $c_{w_j}$ are stored in a respective column of the matrix M in cells connected to a common set of word-lines for the elements $c_{w_j}$, whereby the results of all polynomial multiplications $c_d c_{w_j}$ are obtained by progressively shifting the coefficients of element $c_d$ relative to that set of word-lines until all coefficients of $c_d$ have been supplied bitwise to all word-lines in the set. All polynomial multiplications $c_d c_w$ required as encrypted data values are propagated through the network can be similarly computed. The results of all polynomial multiplications are processed to obtain an encrypted inference result from the model. In particular, individual polynomial multiplication results can be processed in digital processor 5 according to the particular network architecture, applying modulo operations, (encrypted) activation functions and computing input signals for successive network layers as encrypted signals are propagated through the network. This provides a highly efficient homomorphic inference engine for privacy-preserving applications.

Figure 13:
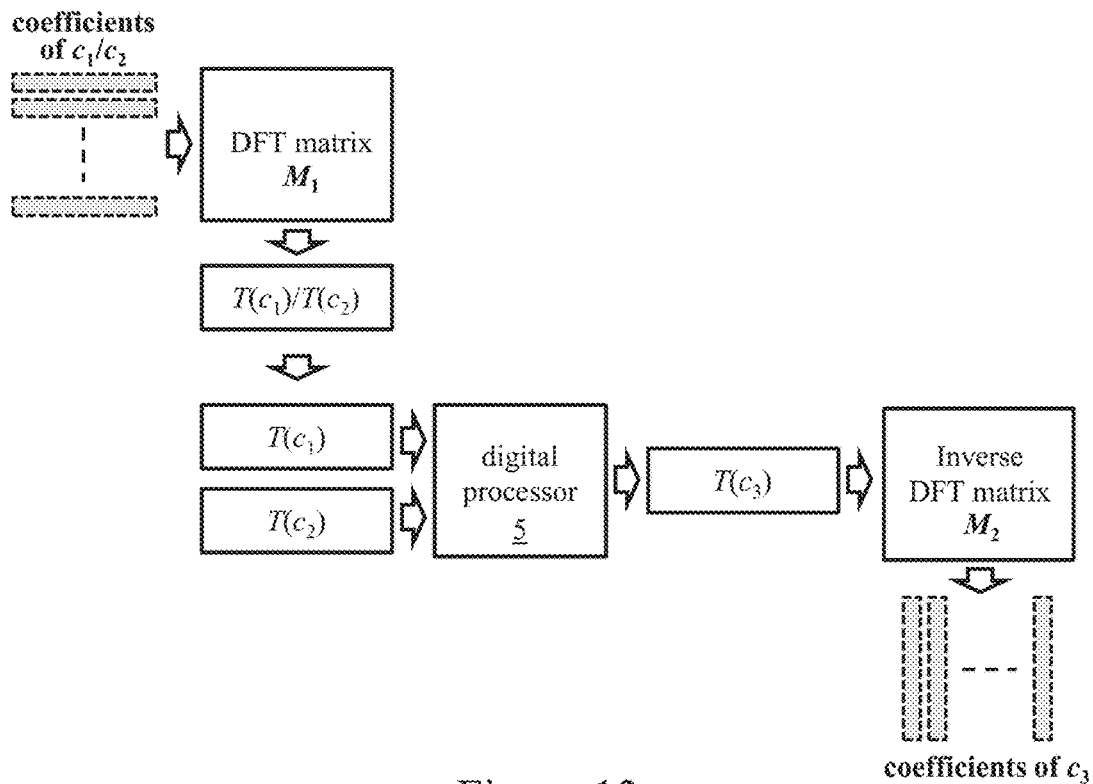
FIG. 13 illustrates polynomial multiplication of cryptographic elements, in accordance with an embodiment of the present invention.

Another embodiment of apparatus 1 employs Discrete Fourier Transforms for multiplying cryptographic elements using analog multiply-accumulate units. The FIG. 13 schematic illustrates operation of this embodiment for computing a polynomial multiplication $c_1 c_2$ of cryptographic elements $c_1$ and $c_2$, each having n polynomial coefficients. In this embodiment, the matrix of multibit values comprises a Discrete Fourier Transform matrix $M_1$ with (integer) values $e_{i,j} 1$, i=0 to (n−1), j=0 to (n−1), given by $e_{i,j} = k^{i \times j}$ modulo p, where $k^N = 1$ modulo p, and N≥n, In addition, an Inverse Discrete Fourier Transform matrix $M_2$ corresponding to $M_1$ is stored as a further matrix of multibit (integer) values in at least one further crossbar array of the MAC unit. The n coefficients of element $c_1$ are supplied bitwise to respective word-lines connected to cells storing values in $M_1$. The digital signals obtained from successive bits of the coefficients are processed to obtain a Discrete Fourier Transform $T(c_1)$ of the coefficients of element $c_1$. Similarly, the n coefficients of element $c_2$ are supplied bitwise to respective word-lines connected to cells storing values in $M_1$, and the resulting digital signals from successive bits of the coefficients are processed to obtain a Discrete Fourier Transform $T(c_2)$ of the coefficients of element $c_2$. Digital processor 5 then performs component-wise multiplication of corresponding components of $T(c_1)$ and $T(c_2)$ to obtain a Discrete Fourier Transform $T(c_3)$ of the coefficients of a cryptographic element $c_3$. The components of $T(c_3)$ are then supplied bitwise to respective word-lines connected to cells storing values in $M_2$. The resulting analog accumulation signals on the bit-lines are converted to digital signals and processed as before to obtain a result of the polynomial multiplication $c_3=c_1c_2$. This result can be obtained modulo p as previously described. The component-wise multiplication in digital processor 5 may be computed by in-memory logic in other embodiments.

It will be seen that the above embodiments offer highly efficient computation over cryptographic elements in HEnc systems. However, various alternatives and modifications can be made to the embodiments described. By way of example, processing operations described may be allocated differently between MAC controller 4 and digital processor 5. Embodiments can be envisaged in which coefficients are input MSB first to MAC arrays. Memory cells 10 may also be implemented using other types of cells than SRAM cells.

In general, where features are described herein with reference to a method embodying the invention, corresponding features may be provided in an apparatus/system embodying the invention, and vice versa. Steps of flow diagrams may be performed in a different order to that shown, and some steps may be performed in parallel as appropriate.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   storing a matrix of multibit values for a computation in an analog multiply-accumulate unit comprising at least one crossbar array of binary analog memory cells connected between respective pairs of word-lines and bit-lines of the at least one crossbar array, wherein:
     bits of each multibit value are stored in cells connected along a word-line; and
     corresponding bits of values in a column of the matrix are stored in cells connected along a bit-line;
   in each of one or more computation stages for a cryptographic element, supplying a set of polynomial coefficients of an element bitwise to respective word-lines of the analog multiplying-accumulate unit to obtain analog accumulation signals on the respective bit-lines;
   converting the analog accumulation signals to digital signals; and
   processing the digital signals obtained from successive bits of the polynomial coefficients in each of the one or more computation stages to obtain a computation result for the cryptographic element.

2. The computer-implemented method of claim 1, further comprising:
   for each bit of the polynomial coefficients supplied bitwise to the word-lines, accumulating the digital signals obtained from a set of bit-lines connected to cells storing values in a column of the matrix with successive bit-shifts corresponding to successive bit-positions of the values; and
   accumulating the digital signals for the successive bits of the polynomial coefficients with successive bit-shifts corresponding to successive bit-positions of the coefficients.

3. The computer-implemented method of claim 1, wherein the computation result for a first cryptographic element $c_1$ is a result of a polynomial multiplication $c_1 c_2$ and wherein $c_2$ is a second cryptographic element, further comprising:
   storing polynomial coefficients of the second cryptographic element $c_2$ in the multiply-accumulate unit as respective multibit values in a first column of said matrix;
   in successive computation stages, progressively shifting the polynomial coefficients of element $c_1$ relative to a set of word-lines connected to cells storing coefficients of $c_2$ until coefficients of $c_1$ have been supplied bitwise to word-lines in the set of word-lines; and
   processing the digital signals obtained, in each of the computation stages, from the set of bit-lines connected to cells storing the coefficients of $c_2$ and from successive bits of the coefficients of $c_1$ to obtain the result of the polynomial multiplication $c_1 c_2$.

4. The computer-implemented method of claim 3, further comprising:
   processing the digital signals to obtain the result of the polynomial multiplication $c_1 c_2$ modulo p, wherein p is a predefined prime number for a homomorphic encryption system.

5. The computer-implemented method of claim 3, further comprising:
   for at least one further cryptographic element c:
     storing polynomial coefficients of element c, as respective multibit values in a further column of said matrix, in cells connected to the set of word-lines; and
     processing the digital signals obtained, in each of said the computation stages, from the set of bit-lines connected to cells storing the coefficients of c and from successive bits of the coefficients of $c_1$ to obtain a further result of the further polynomial multiplication $c_1 c$.

6. The computer-implemented method of claim 3, wherein:
   the second cryptographic element $c_2$ is an elements of a secret key (1, s) of a homomorphic encryption system;
   the first cryptographic element $c_1$ is an element of a cyphertext ($c_0$, $c_1$) encrypted under a corresponding public key;
   $c_0$ is another cryptographic element; and
   further comprising, subsequent to obtaining a result of a polynomial multiplication $c_1 s$, computing a sum of $c_1 s$ and $c_0$ to obtain a decryption $m = c_0 + c_1 s$ modulo p of the cyphertext, wherein p is a predefined prime number for the homomorphic encryption system.

7. The computer-implemented method of claim 6, further comprising:
   computing the sum in an in-memory logic array.

8. The computer-implemented method of claim 3, wherein:
   encrypted weights w of a neural network inference model comprise respective cryptographic elements $c_w$ and polynomial coefficients of each element $c_w$ are stored in the multiply-accumulate unit as respective multibit values in a column of the matrix;
   encrypted data values d to be weighted and propagated through the network in an inference operation comprise respective cryptographic elements $c_d$ for which polynomial multiplication $c_d c_w$ is required to weight a data value d by a weight w;

further comprising:

performing each polynomial multiplication $c_d c_w$ in the inference operation, wherein $c_d$ corresponds to the first cryptographic element $c_1$ and $c_w$ corresponds to the second cryptographic element $c_2$; and processing the results of polynomial multiplications $c_d c_w$ as encrypted data values are propagated through the network to obtain an encrypted inference result from the model.

9. The computer-implemented method of claim 8, wherein:

for an encrypted data value d to be weighted by a plurality of weights $w_{j=1\ to\ L}$ for propagation through the neural network, requiring a corresponding plurality of polynomial multiplications $c_d c_{w_j}$, the coefficients of each element $c_{w_j}$ stored in a respective column of said matrix in cells connected to a common set of word-lines for the elements $c_{w_j}$; and the results of polynomial multiplications $c_d c_{w_j}$ are obtained by progressively shifting the coefficients of element $c_d$ relative to that set of word-lines until coefficients of $c_d$ have been supplied bitwise to word-lines in the set.

10. The computer-implemented method of claim 1, further comprising:

for computing a polynomial multiplication $c_1 c_2$ of first cryptographic element $c_1$ and a second cryptographic element $c_2$, each having n polynomial coefficients, wherein said matrix of multibit values comprises a Discrete Fourier Transform matrix $M_1$ with values $e_{i,j}$, i=0 to (n−1), j=0 to (n−1), given by $e_{i,j}=k^{i \times j}$ modulo p, wherein $k^N=1$ modulo p, N≥n and p is a predefined prime number for a homomorphic encryption system, comprising:

storing an Inverse Discrete Fourier Transform matrix $M_2$ corresponding to $M_1$ as a further matrix of multibit values in a further crossbar array of the multiply-accumulate unit;

supplying n coefficients of element $c_1$ bitwise to respective word-lines connected to cells storing values in $M_1$, and processing the digital signals obtained from successive bits of the coefficients to obtain a Discrete Fourier Transform $T(c_1)$ of the coefficients of element $c_1$;

supplying n coefficients of element $c_2$ bitwise to respective word-lines connected to cells storing values in $M_1$, and processing the digital signals obtained from successive bits of the coefficients to obtain a Discrete Fourier Transform $T(c_2)$ of the coefficients of element $c_2$;

performing component-wise multiplication of corresponding components of $T(c_1)$ and $T(c_2)$ to obtain another Discrete Fourier Transform $T(c_3)$ of the coefficients of a cryptographic element $c_3$; and supplying the components of $T(c_3)$ bitwise to respective word-lines connected to cells storing values in $M_2$ to obtain analog accumulation signals on the bit-lines, converting the analog accumulation signals to digital signals and processing the digital signals obtained from successive bits of the components to obtain a result of the polynomial multiplication $c_3=c_1 c_2$.

11. The computer-implemented method of claim 10, further comprising:

processing the digital signals to obtain the result of the polynomial multiplication $c_1 c_2$ modulo p, where p is a predefined prime number for the homomorphic encryption system.

12. The computer-implemented method of claim 1, further comprising:

performing an operation selected from the group consisting of: (i) addition, (ii) subtraction, (iii) scaling, and (iv) component-wise multiplication, of cryptographic elements required for a the computation using an in-memory logic array.

13. The computer-implemented method of claim 1, wherein the binary analog memory cells comprise analog static random access memory (SRAM) cells.

14. A computer system comprising:

a homomorphic encryption system in which cryptographic elements are represented by polynomials with multibit coefficients, comprising an analog multiply-accumulate unit having at least one crossbar array of binary analog memory cells connected between respective pairs of word-lines and bit-lines of the at least one crossbar array, one or more computer readable storage media, and program instructions collectively stored on the one or more computer readable storage media for execution, the program instructions comprising:

program instructions to store a matrix of multibit values for a computation in an analog multiply-accumulate unit comprising at least one crossbar array of binary analog memory cells connected between respective pairs of word-lines and bit-lines of the at least one crossbar array, wherein:

bits of each multibit value are stored in cells connected along a word-line; and corresponding bits of values in a column of the matrix are stored in cells connected along a bit-line;

program instructions to, in each of one or more computation stages for a cryptographic element, supply a set of polynomial coefficients of an element bitwise to respective word-lines of the analog multiplying-accumulate unit to obtain analog accumulation signals on the respective bit-lines;

program instructions to convert the analog accumulation signals to digital signals; and program instructions to process the digital signals obtained from successive bits of the polynomial coefficients in each of the one or more computation stages to obtain a computation result for the cryptographic element.

15. The computer system of claim 14, further comprising:

program instructions to, for each bit of the polynomial coefficients supplied bitwise to the word-lines, accumulate the digital signals obtained from a set of bit-lines connected to cells storing values in a column of the matrix with successive bit-shifts corresponding to successive bit-positions of the values; and program instructions to accumulate the digital signals for the successive bits of the polynomial coefficients with successive bit-shifts corresponding to successive bit-positions of the coefficients.

16. The computer system of claim 14, wherein the computation result for a first cryptographic element $c_1$ is a result of a polynomial multiplication $c_1 c_2$ and wherein $c_2$ is a second cryptographic element, further comprising:

program instructions to store polynomial coefficients of the second cryptographic element $c_2$ in the multiply-accumulate unit as respective multibit values in a first column of said matrix;

program instructions to, in successive computation stages, progressively shift the polynomial coefficients of element $c_1$ relative to a set of word-lines connected to cells storing coefficients of $c_2$ until coefficients of $c_1$ have been supplied bitwise to word-lines in the set of word-lines; and program instructions to process the digital signals obtained, in each of the computation stages, from the set of bit-lines connected to cells storing the coefficients of $c_2$ and from successive bits of the coefficients of $c_1$ to obtain the result of the polynomial multiplication $c_1c_2$.

17. The computer system of claim 16, further comprising:
program instructions to process the digital signals to obtain the result of the polynomial multiplication $c_1c_2$ modulo p, wherein p is a predefined prime number for a homomorphic encryption system.

18. The computer system of claim 16, further comprising:
program instructions to, for at least one further cryptographic element c:
  store polynomial coefficients of element c, as respective multibit values in a further column of said matrix, in cells connected to the set of word-lines; and
  process the digital signals obtained, in each of said the computation stages, from the set of bit-lines connected to cells storing the coefficients of c and from successive bits of the coefficients of $c_1$ to obtain a further result of the further polynomial multiplication $c_1c$.

19. The computer system of claim 16, wherein:
the second cryptographic element $c_2$ is an elements of a secret key (1, s) of a homomorphic encryption system;
the first cryptographic element $c_1$ is an element of a cyphertext $(c_0, c_1)$ encrypted under a corresponding public key;
$c_0$ is another cryptographic element; and
further comprising program instructions to, subsequent to obtaining a result of a polynomial multiplication $c_1s$, compute a sum of $c_1s$ and $c_0$ to obtain a decryption $m=c_0+c_1s$ modulo p of the cyphertext, wherein p is a predefined prime number for the homomorphic encryption system.

20. A computer program product comprising:
one or more computer readable storage media, and program instructions collectively stored on the one or more computer readable storage media, the program instructions comprising:
  program instructions to store a matrix of multibit values for a computation in an analog multiply-accumulate unit comprising at least one crossbar array of binary analog memory cells connected between respective pairs of word-lines and bit-lines of the at least one crossbar array, wherein:
    bits of each multibit value are stored in cells connected along a word-line; and
    corresponding bits of values in a column of the matrix are stored in cells connected along a bit-line;
  program instructions to, in each of one or more computation stages for a cryptographic element, supply a set of polynomial coefficients of an element bitwise to respective word-lines of the analog multiplying-accumulate unit to obtain analog accumulation signals on the respective bit-lines;
  program instructions to convert the analog accumulation signals to digital signals; and
program instructions to process the digital signals obtained from successive bits of the polynomial coefficients in each of the one or more computation stages to obtain a computation result for the cryptographic element.

\* \* \* \* \*